(12) United States Patent
Kuroda et al.

(10) Patent No.: US 10,232,678 B2
(45) Date of Patent: Mar. 19, 2019

(54) STABILIZER BAR WITH RUBBER BUSH AND METHOD FOR PRODUCING SAME

(71) Applicant: NHK SPRING CO., LTD., Yokohama, Kanagawa (JP)

(72) Inventors: Shigeru Kuroda, Kanagawa (JP); Kenji Katsuno, Kanagawa (JP)

(73) Assignee: NHK SPRING CO., LTD., Kanagawa (JP)

( * ) Notice: Subject to any disclaimer, the term of this patent is extended or adjusted under 35 U.S.C. 154(b) by 56 days.

(21) Appl. No.: 15/305,276

(22) PCT Filed: Apr. 13, 2015

(86) PCT No.: PCT/JP2015/061316
§ 371 (c)(1),
(2) Date: Oct. 19, 2016

(87) PCT Pub. No.: WO2015/163173
PCT Pub. Date: Oct. 29, 2015

(65) Prior Publication Data
US 2017/0043641 A1    Feb. 16, 2017

(30) Foreign Application Priority Data
Apr. 24, 2014  (JP) ................................ 2014-090505

(51) Int. Cl.
*B60G 21/055*  (2006.01)
*F16F 1/38*  (2006.01)
*F16F 15/08*  (2006.01)

(52) U.S. Cl.
CPC ....... *B60G 21/055* (2013.01); *B60G 21/0551* (2013.01); *F16F 1/38* (2013.01);
(Continued)

(58) Field of Classification Search
CPC ............. B60G 21/055; B60G 21/0551; B60G 2206/821; B60G 2206/73; B60G 2204/41; F16F 1/38; F16F 15/08
(Continued)

(56) References Cited

U.S. PATENT DOCUMENTS

2013/0057309 A1 * 3/2013 Kojima .................... C25D 1/02
324/755.05

FOREIGN PATENT DOCUMENTS

| CN | 202278950 U | 6/2012 |
| CN | 102874066 A | 1/2013 |

(Continued)

OTHER PUBLICATIONS

Extended European Search Report, European Patent Application No. 15782531.6, dated Nov. 10, 2017, 15 pgs.
(Continued)

*Primary Examiner* — Keith J Frisby
(74) *Attorney, Agent, or Firm* — Volpe and Koenig, P.C.

(57) ABSTRACT

A stabilizer bar with rubber bush includes a stabilizer bar (2), and at least one rubber bush (6) adhesively fixed to at least a portion of the stabilizer bar. The stabilizer bar (2) and the rubber bush (6) are adhesively fixed to each other with an adhesive agent layer (3). The adhesive agent layer (3) includes a primer agent layer (4) formed on a surface of the stabilizer bar (2) and having a dry film thickness of 3 μm or more and 13 μm or less; and a first top coat agent layer (5) formed on the primer agent layer (4) and having a dry film thickness of 5 μm or more and less than 13 μm.

6 Claims, 4 Drawing Sheets

(52) U.S. Cl.
 CPC .......... *F16F 15/08* (2013.01); *B60G 2204/41* (2013.01); *B60G 2206/73* (2013.01); *B60G 2206/821* (2013.01)

(58) Field of Classification Search
 USPC .................................................. 280/124.15
 See application file for complete search history.

(56) References Cited

FOREIGN PATENT DOCUMENTS

| | | | |
|---|---|---|---|
| CN | 102989643 | A | 3/2013 |
| CN | 103407345 | A | 11/2013 |
| JP | 2005-319850 | * | 11/2005 |
| JP | 2005-319850 | A | 11/2005 |
| JP | 2006-027311 | A | 2/2006 |
| JP | 2006-096116 | A | 4/2006 |
| JP | 2012-121414 | A | 6/2012 |
| KR | 1020130051525 | A2 | 5/2013 |

OTHER PUBLICATIONS

Lord: "Post-Vulcanization (PV) Bonding for Automotive Suspension Systems," Jan. 1, 2011 (Jan. 1, 2011), XP055420421, Cary, NC 27511-7923, USA Retrieved from the Internet: URL:http://www.lordfulfillment.com/upload/PB3094.pdf [retrieved on Oct. 31, 2017].
Lord: "Lord Technical Data Chemlok 252X Adhesive," Jan. 1, 2012 (Jan. 1, 2012), XP055420425, Cary, NC 27511-7923, USA Retrieved from the Internet: URL:https://www.lord.com/sites/default/files/Documents/TechnicalDataSheet/DS3126_Chemlok252X.pdf [retrieved on Oct. 31, 2017].
Lord: "Lord Technical Data Chemlok 205LH Primer," Jan. 1, 2009 (Jan. 1, 2009), XP055420439, Cary, NC 27511-7923, USA Retrieved from the Internet: URL:https://www.lord.com/sites/default/files/Documents/TechnicalDataSheet/DS3889_Chemlok205LH.pdf [retrieved on Oct. 31, 2017].
Lord: "Lord Technical Data Chemlok 220 Adhesive," Jan. 1, 2012 (Jan. 1, 2012), XP055417773 Retrieved from the Internet: URL:https://www.lord.com/sites/default/files/Documents/TechnicalDataSheet/DS3105_Chemlok220/pdf [retrieved on Oct. 20, 2017].
Hancock, J., "Ultrasonic Cleaning," Surface Engineering—ASM Handbook, vol. 5, Jan. 1, 1994 (Jan. 1, 1994), ASM International, Materials Park, OH 44073-0002, US, XP009501018, vol. 5, pp. 44-47.
International Search Report mailed in corresponding International Pat. Appln. No. PCT/JP2015/061316 dated Jun. 9, 2015, consisting of 4 pp. (English Translation Provided).
Written Opinion issued in corresponding International Pat. Appln. No. PCT/JP2015/061316 dated Jun. 9, 2015, consisting of 4 pp. (English Translation Provided.
Chinese Office Action dated Apr. 2, 2018 for the Chinese Patent Application No. 201580015706.8.
"Application of Ultrasonic wave in Rubber Industry", GUO wen, Tianjin Rubber, vol. 2 of the year 1997, p. 37, (Jul. 1997). (Please see English concise explanation provided on p. 4 of enclosed English-language translation of Chinese Office Action dated Apr. 2, 2018 for the Chinese Patent Application No. 201580015706.8).
Istomin, "Metal Extrusion" p. 125, Metallurgical Industry Press (Oct. 1957) (please see English concise explanation of the relevance provided by English translation of the Chinese Office Action dated Dec. 4, 2018 for the Chinese Patent Application No. 201580015706, at p. 2, last line, to p. 3, line 7).
Chinese Office Action dated Dec. 4, 2018 for the Chinese Patent Application No. 201580015706.

* cited by examiner

STABILIZER BAR WITH RUBBER BUSH AND METHOD FOR PRODUCING SAME

TECHNICAL FIELD

The present invention relates to a stabilizer bar with rubber bush and a method for producing the same.

BACKGROUND ART

An automobile is equipped with a pair of suspension devices for left and right wheels and a stabilizer connecting the pair of suspensions. The stabilizer plays the following role. Specifically, for example, when the automobile turns and the vehicle body is inclined (roll phenomenon), the stabilizer exerts a spring action (elastic force for restoration from torsional deformation) utilizing the repulsive force generated by the torsion of a spring steel according to the deviation of the positions of the left and right wheels, thereby preventing the roll of the vehicle.

A stabilizer is a component including a stabilizer bar using a spring steel which is formed into a substantially U shape. Both end portions of the stabilizer bar having the substantially U shape are attached to suspension arms with connection rods, respectively. In addition, the center portion of the stabilizer bar is provided rotatably with respect to the vehicle body. Note that a rubber bush may be attached to at least a portion of the center portion of the stabilizer bar for the purposes of antivibration and the like. The rubber bush is adhesively fixed to a bracket, and the bracket is fixed to the vehicle body with bolts or the like.

Conventionally, the rubber bush is attached to the stabilizer bar not by adhesively fixing or the like, but by simply bringing the rubber bush onto the center portion of the stabilizer bar while the stabilizer bar is inserted through the rubber bush. However, mud, sand, salt water, or the like may enter the space between the stabilizer bar and the rubber bush, so that a coating film provided on the surface of the stabilizer bar may be broken, in some cases. When the coating film provided on the surface of the stabilizer bar is broken, problems may be caused such as corrosion of the stabilizer bar or even bending of the stabilizer bar due to the progress of the corrosion. Moreover, when water enters the space between the stabilizer bar and the rubber bush or when the atmospheric temperature is extremely low, problems may be caused such as noise generation due to slippage of the rubber bush on the stabilizer bar. To solve these problems, stabilizer bars to which rubber bushes are adhesively fixed with adhesive agents have been developed recently, and patent documents relating to these stabilizer bars have been disclosed (see, for example, Patent Documents 1 and 2).

Patent Document 1 discloses a stabilizer bar with rubber bush, in which a tubular rubber bush having a U-shaped outer peripheral surface and a straight line-shaped flat surface continuous to both ends of the U-shaped outer peripheral surface is fixed by being fitted to the outside of a fitted portion of the stabilizer bar. More specifically, as the stabilizer bar with rubber bush, Patent Document 1 discloses a stabilizer bar with rubber bush, wherein the rubber bush is formed by vulcanization such that a projecting and curved portion, whose outer peripheral surface is a projecting and curved surface of the U-shaped outer peripheral surface, of the rubber bush can take a state of bulging outwardly in the radial direction by a set amount relative to the dimension of the target product; the rubber bush is put on the outside of the fitted portion of the stabilizer bar on which a thermosetting adhesive agent is applied; and, with the rubber bush being compressed by pressing the projecting curved surface and the flat surface, the rubber bush is heated to be adhesively fixed to the fitted portion.

Patent Document 2 discloses a bush- and bracket-integrated stabilizer bar including a stabilizer bar, a rubber bush attached to an outer periphery of the stabilizer bar, and a bracket provided to an outer periphery of the rubber bush and configured to mount the stabilizer bar to a bottom portion of a vehicle body with the rubber bush, wherein the stabilizer bar includes an amine-based curable epoxy paint or an amine-containing cationic paint and a surface treatment layer containing a halogen donor-based surface treatment agent on the paint, the rubber bush includes a surface treatment layer containing a halogen donor-based surface treatment agent on an inner surface thereof, and an adhesive agent layer containing an amine-based or organic hydrazide-based curing agent and an epoxy resin is formed between the stabilizer bar and the rubber bush with each of the surface treatment layers intervened.

CITATION LIST

Patent Literature

Patent Document 1: Japanese Patent Application Publication No. 2006-27311
Patent Document 2: Japanese Patent Application Publication No. 2012-121414

SUMMARY OF INVENTION

Technical Problem

However, attached substances (organic compounds) such as wax and grease may be attached to the surface of a rubber bush in some cases. When an adhesive agent (referred to as a thermosetting adhesive agent in Patent Document 1 or an epoxy resin in Patent Document 2) is applied as disclosed in Patent Document 1 or 2, an operation of cleaning the surface of the rubber bush to remove these attached substances is commonly performed to obtain a good adhesive effect, although this operation is not described in any of Patent Documents 1 and 2. This cleaning is often performed by using an organic solvent such as xylene. The use of the organic solvent not only requires the disposal cost of the organic solvent used, but also increases the number of steps for the producing. For this reason, volatile organic compounds (VOCs) are generated over many process areas during the producing, so that the working environment is impaired. Accordingly, the invention disclosed in Patent Document 1 has problems of poor economical efficiency and poor environmental friendliness. Especially, criteria for evaluating the working environment regarding organic solvents have been determined recently under the Industrial Safety and Health Act. In this respect, there has been a problem in that these criteria cannot be achieved in producing process, for example, in a case where the producing amount increases. Moreover, with the standard of action for environment having widely prevailed recently, it has been demanded that criteria for evaluating the working environment including those of VOCs should be met at higher levels.

Moreover, when an organic solvent is used, it is necessary to rinse the organic solvent attached to the surface of the rubber bush with water or the like. For this reason, the inventions disclosed in Patent Documents 1 and 2 have a problem of poor productivity.

In addition, since no special consideration is given to the application of the adhesive agent in any of the inventions disclosed in Patent Document 1 or 2, the amount of the adhesive agent applied may be too much. For example, Chemlok (registered trademark) is a representative adhesive agent used to adhesively fix a stabilizer bar and a rubber bush to each other. The specifications (manual) of Chemlok recite that the dry film thickness of the primer agent layer should be 5.1 μm or more and 10.2 μm or less, and the dry film thickness of the top coat agent layer should be 20.3 μm or more and 38.1 μm or less. Accordingly, the inventions disclosed in Patent Documents 1 and 2 have a problem of poor economical efficiency, because the amount of the adhesive agent applied is too much.

The present invention has been made in view of the above-described problems, and an object of the present invention is to provide a stabilizer bar with rubber bush which is excellent in environmental friendliness, productivity, and economical efficiency and a method for producing the same.

Solution to Problem

The present invention by which the above-described object is achieved includes the following means.
(1) A stabilizer bar with rubber bush, including: a stabilizer bar; and at least one rubber bush adhesively fixed to at least a portion of the stabilizer bar, wherein the stabilizer bar and the rubber bush are adhesively fixed to each other with an adhesive agent layer, and wherein the adhesive agent layer includes a primer agent layer which is formed on a surface of the stabilizer bar and which has a dry film thickness of 3 μm or more and 13 μm or less, and a first top coat agent layer which is formed on the primer agent layer and which has a dry film thickness of 5 μm or more and less than 13 μm.
(2) The stabilizer bar with rubber bush set forth in the above-described (1), wherein the primer agent layer contains a rubber resin at a ratio of 5% by mass or higher and lower than 10% by mass, and wherein the first top coat agent layer contains a rubber resin at a ratio of 10% by mass or higher and 15% by mass or lower.
(3) The stabilizer bar with rubber bush set forth in the above-described (1), wherein a surface conditioning agent layer is formed on at least a portion of a surface of the rubber bush.
(4) The stabilizer bar with rubber bush set forth in the above-described (3), wherein a second top coat agent layer is formed on the surface conditioning agent layer.
(5) A method for producing a stabilizer bar with rubber bush, the method comprising: a rubber bush-cleaning step of ultrasonically cleaning a rubber bush in hot water; a primer agent layer formation step of forming a primer agent layer by applying a primer agent to a stabilizer bar at a predetermined portion where the rubber bush is to be adhered to achieve a dry film thickness of 3 μm or more and 13 μm or less, followed by drying; a first top coat agent layer formation step of forming a first top coat agent layer by applying a first top coat agent onto the formed primer agent layer to achieve a dry film thickness of 5 μm or more and less than 13 μm, followed by drying; and an adhesive fixing step of bringing the rubber bush subjected to the ultrasonic cleaning into contact with the first top coat agent layer and adhesively fixing the rubber bush onto the first top coat agent layer.
(6) The method for producing the stabilizer bar with rubber bush set forth in the above-described (5), wherein the rubber bush-cleaning step, the primer agent layer formation step, and the first top coat agent layer formation step are performed in an order of the primer agent layer formation step, the first top coat agent layer formation step, and the rubber bush-cleaning step or in an order of the primer agent layer formation step, the rubber bush-cleaning step, and the first top coat agent layer formation step.
(7) The method for producing the stabilizer bar with rubber bush set forth in the above-described (5), further including, before the primer agent layer formation step, a stabilizer bar-cleaning step of cleaning a surface of the stabilizer bar.
(8) The method for producing the stabilizer bar with rubber bush according to the above-described (7), further including, after the stabilizer bar-cleaning step, a preheating step of preheating the cleaned stabilizer bar.
(9) The method for producing the stabilizer bar with rubber bush according to the above-described (5), further including, between the rubber bush-cleaning step and the adhesive fixing step, a surface conditioning agent layer formation step of forming a surface conditioning agent layer by applying a surface conditioning agent onto at least a portion of a surface of the rubber bush, followed by drying.
(10) The method for producing the stabilizer bar with rubber bush set forth in the above-described (9), further including, after the surface conditioning agent layer formation step, a second top coat agent layer formation step of forming a second top coat agent layer by applying a second top coat agent onto the surface conditioning agent layer, followed by drying.
(11) The method for producing the stabilizer bar with rubber bush set forth in the above-described (5), wherein the temperature of the hot water is 40° C. or above and 60° C. or below, and wherein the frequency of the ultrasonic for the ultrasonic cleaning is 25 kHz or higher and 45 kHz or lower.
(12) The method for producing the stabilizer bar with rubber bush set forth in the above-described (5), wherein the primer agent contains a rubber resin at a ratio of 5% by mass or higher and lower than 10% by mass, and the first top coat agent contains a rubber resin at a ratio of 10% by mass or higher and 15% by mass or lower.

Advantageous Effects of Invention

The present invention makes it possible to provide a stabilizer bar with rubber bush excellent in environmental friendliness, productivity, and economical efficiency, and a method for producing the same.

DESCRIPTION OF EMBODIMENTS

Hereinafter, modes (embodiments) for carrying out a stabilizer bar with rubber bush and a method for producing the same according to the present invention will be described in detail with reference to the drawings, as appropriate.

(Stabilizer Bar with Rubber Bush)

First, an embodiment of the stabilizer bar with rubber bush according to the present invention will be described with reference to FIGS. 1 to 4.

Figure 2:
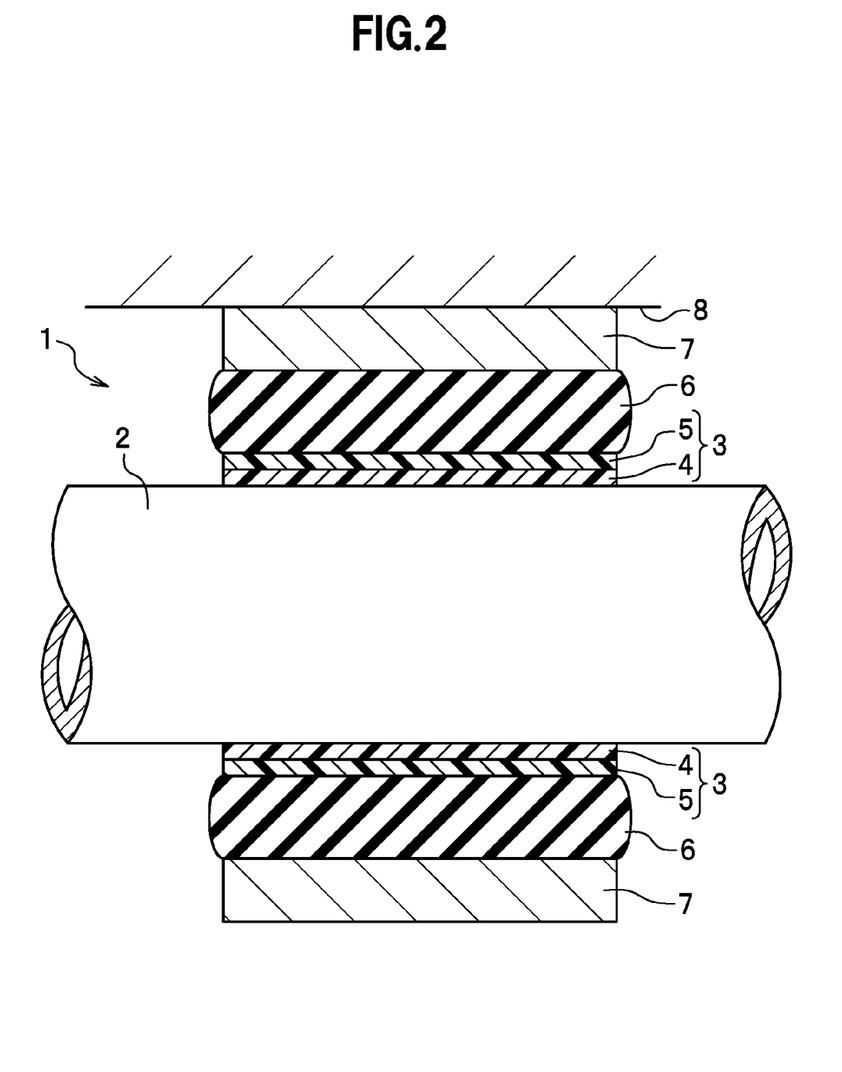
FIG. 2 is a view (partial cross-sectional view) which is taken along the line II-II in the direction of the arrows in FIG. 1 and which illustrates a configuration of the stabilizer bar with rubber bush according to the present invention.
Figure 3:
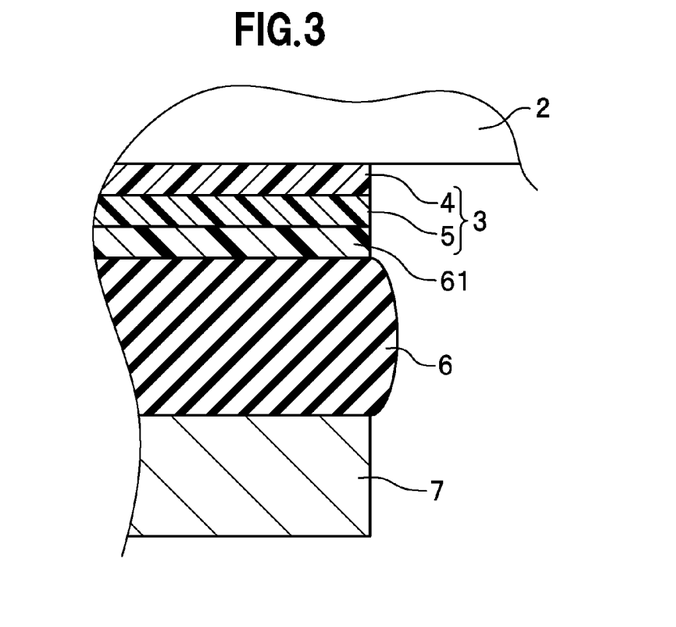
FIG. 3 is a cross-sectional view illustrating a preferred embodiment of a rubber bush used in the present invention.
Figure 4:
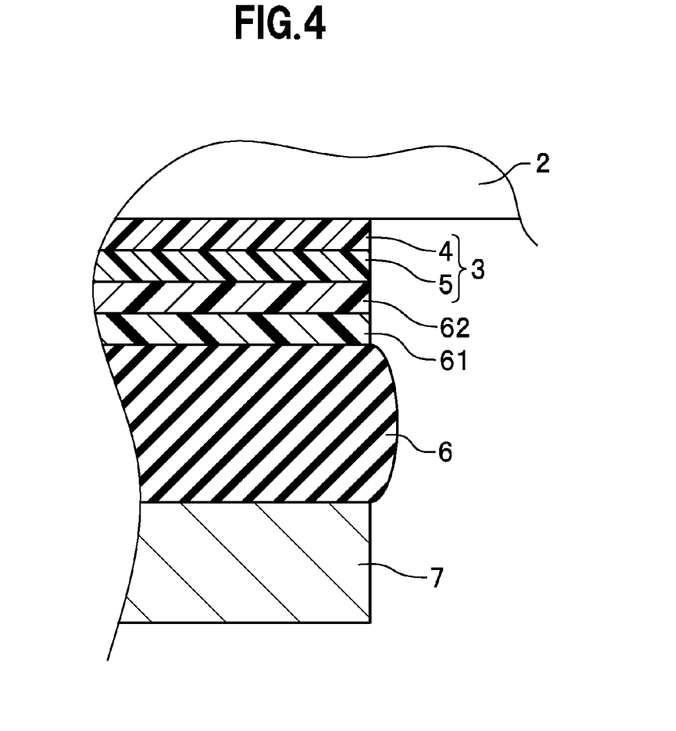
FIG. 4 is a cross-sectional view illustrating another preferred embodiment of a rubber bush used in the present invention.

Note that the thickness of each constituent in FIGS. 2 to 4 is exaggerated to make the description of the contents of the invention easier to understand. Especially, a dry film thickness of a primer agent layer 4, a dry film thickness of a first top coat agent layer 5, a dry film thickness of a surface conditioning agent layer 61, and a dry film thickness of a second top coat agent layer 62 shown in FIG. 2 are in the order of micrometers as described later, and actual products are different from those illustrated in the drawing.

Figure 1:
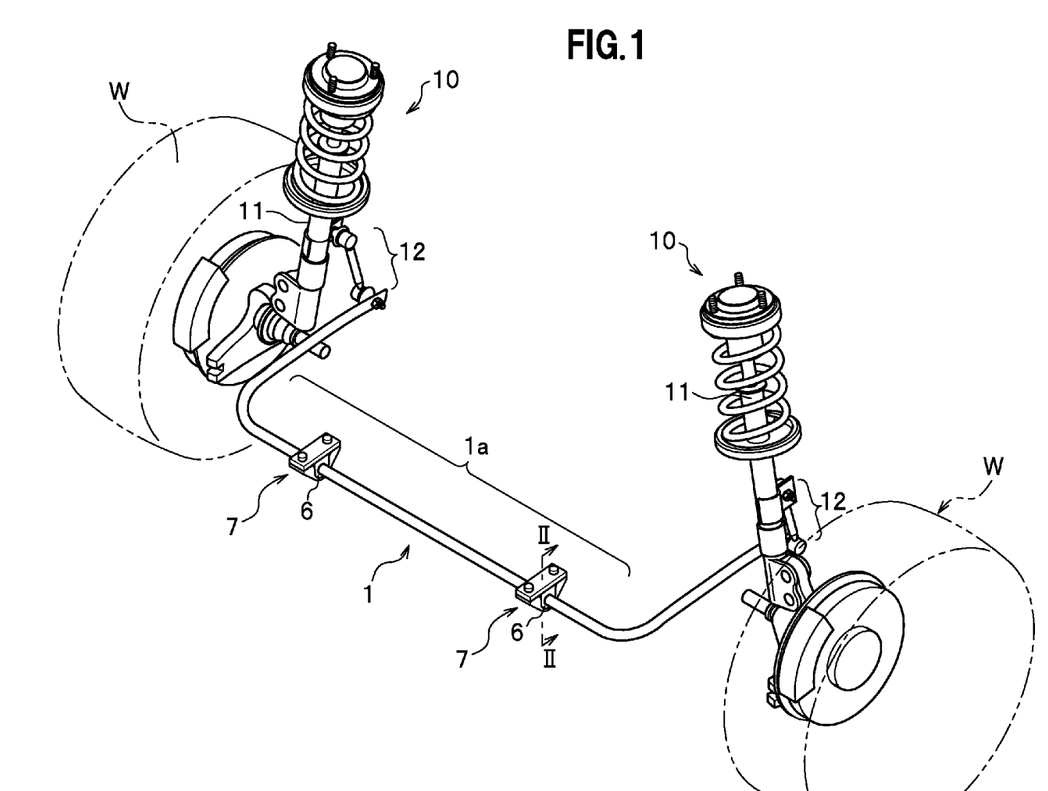
FIG. 1 is a perspective view of a stabilizer in which a stabilizer bar with rubber bush according to the present invention is used.

As shown in FIG. 1, a stabilizer bar with rubber bush 1 according to this embodiment connects shock absorbers 11 of two suspension devices 10 and 10 each of which supports the corresponding one of left and right wheels W and W facing each other. The stabilizer bar with rubber bush 1 is provided to extend between one of the shock absorbers 11 and the other one of the shock absorbers 11. In other words, the stabilizer bar with rubber bush 1 is disposed in a direction extending between the left and right wheels W and W.

For example, in a case where a vehicle turns, a center portion 1a of the stabilizer bar with rubber bush 1 is twisted because of the difference in amount of displacement between the left and right two shock absorbers 11 and 11, and the stabilizer bar with rubber bush 1 prevents the roll of the vehicle under the elastic force for restoration from the torsional deformation.

The stabilizer bar with rubber bush 1 and each shock absorber 11 are connected to each other by a link arm member 12.

As shown in FIG. 1, the stabilizer bar with rubber bush 1 according to this embodiment includes a substantially U-shaped stabilizer bar 2, and at least one rubber bush 6 adhesively fixed to at least a portion of the stabilizer bar 2. In addition, the rubber bush 6 is adhesively fixed to a metal bracket 7 with an adhesive agent layer 3 or by a vulcanization reaction, as shown in FIG. 2, and the bracket 7 is fixed to a vehicle body 8 with bolts or the like (not-illustrated).

(Stabilizer Bar)

The stabilizer bar 2 is a hollow or solid rod-shaped component formed in a substantially U shape by using a spring steel. In other words, the stabilizer bar 2 is a torsion bar spring. As the spring steel, for example, SUP3, SUP6, SUP7, SUP9, SUP9A, SUP10, SUP11A, SUP12, or SUP13 specified in JIS G 4801:2005 or the like can be used preferably. Of these spring steels, SUP10 is preferable.

Note that a surface of the stabilizer bar 2 is preferably provided with a coating. The coating on the surface of the stabilizer bar 2 makes it possible to prevent corrosion of the stabilizer bar 2. The coating can be formed by using, for example, an amine-based curable epoxy paint or an amine-containing cationic electrodeposition paint.

As the amine-based curable epoxy paint, it is possible to use, for example, a bisphenol A-type epoxy resin, a bisphenol F-type epoxy resin, or a novolac-type epoxy resin, as described in Japanese Patent Application Publication No. Hei 7-224234. As a curing agent for curing the amine-based curable epoxy paint, for example, a solid amine or an organic acid hydrazide can be used. As the solid amine, for example, 1,12-dodecanamine, 4,4'-diaminodiphenylmethane, or 2,4-tolylenediamine may be used. As the organic acid hydrazide, for example, succinic hydrazide, adipic hydrazide, sebacic hydrazide, or isophthalic hydrazide may be used.

As the amine-containing cationic electrodeposition paint, it is possible to use, for example, a reaction product between a polyepoxy resin and a cationization agent, a product obtained by acid protonation of a polycondensate of a polycarboxylic acid with a polyamine, a product obtained by acid protonation of a polyaddition product of a polyisocyanate compound with a polyol and a monoamine or a polyamine, as described in Japanese Patent Application Publication No. 2002-121491. As the cationization agent, for example, an amine compound of a primary amine, a secondary amine, a tertiary amine, or a polyamine can be used.

Note that the coating applied to the surface of the stabilizer bar 2 is not limited to those described above, but the coating may be formed by using a paint generally used for coating for automobile.

(Rubber Bush)

The rubber bush 6 is a bottomless cylindrical rubber member. The rubber bush 6 is adhesively fixed to the stabilizer bar 2 at a predetermined position thereof. As shown in FIGS. 1 and 2, the rubber bush 6, keeping the cylindrical shape, is brought onto the stabilizer bar 2 to be inserted through the rubber bush 6, and is adhesively fixed thereto with the adhesive agent layer 3. In addition, the rubber bush 6 may be formed of several divided parts which are adhered to each other by vulcanization into one piece, while being adhesively fixed to the stabilizer bar 2 at the predetermined position thereof with the adhesive agent layer 3.

For example, the rubber bush 6 is preferably a vulcanized rubber. As the vulcanized rubber, it may use for example, natural rubber (NR), styrene.butadiene rubber (SBR), nitrile rubber (NBR), butyl rubber (IIR), chloroprene rubber (CR), acrylic rubber (ACM), silicone rubber, fluororubber, synthetic natural rubber (IR), hydrogenated NBR, or the like.

The vulcanization reaction of the vulcanized rubber is performed by any method suitable for the rubber. The vulcanization reaction of the vulcanized rubber is performed based on, for example, sulfur vulcanization, peroxide cross-linking, thiuram vulcanization, sulfur vulcanization, resin vulcanization, ethylene thiourea vulcanization, zinc white vulcanization, soap vulcanization, ammonium benzoate vulcanization, zinc dimethylcarbamate vulcanization, polyamine vulcanization, polyol vulcanization, or the like.

As described above, attached substances such as wax and grease may be attached to the surface of the rubber bush 6 in some cases. For this reason, in order to obtain a good adhesive effect, it is a common practice to clean the surface of a rubber bush by using an organic solvent such as xylene and remove these attached substances. However, various investigations conducted by the present inventors have inferred that the cleaning using an organic solvent is not capable of sufficiently removing these attached substances attached to the surface of the rubber bush 6, or the residual organic solvent lowers the adhesive force of the adhesive agent layer. The present inventors have conducted intensive study based on these findings, and consequently found that those problems is solved by performing a rubber bush-cleaning step S1 of cleaning a rubber bush under a specific condition, so that a sufficient adhesive force is obtained, even when the adhesive agent layer has a dry film thickness smaller than conventional ones. Note that the rubber bush-cleaning step S1 is described in detail later. In other words, the rubber bush 6 used in the present invention is one obtained by performing the rubber bush-cleaning step S1 under a specific condition described later. Here, the sufficient adhesive force refers to, for example, such a strong adhesion that when the rubber bush 6 adhered to the stabilizer bar 2 is peeled off, the original surface of the stabilizer bar 2 is not exposed, but the rubber is broken (rubber break). On the other hand, when the adhesive force is insufficient, the rubber break does not occur, but the original surface of the stabilizer bar 2 is exposed.

(Surface Conditioning Agent Layer)

To further increase the adhesive force between the rubber bush 6 and the stabilizer bar 2, it is preferable to form a surface conditioning agent layer 61 at least a portion of the surface of the rubber bush 6 or preferably at a portion to be adhered to the first top coat agent layer 5 formed on the stabilizer bar 2, as shown in FIG. 3, after the surface of the rubber bush 6 is cleaned in the rubber bush-cleaning step S1 under a specific condition described later. The surface conditioning agent layer 61 only needs to be formed on the surface of the rubber bush 6, and the dry film thickness of the surface conditioning agent layer 61 is not particularly limited, and is preferably, for example, 0.1 µm or more and 2.0 µm or less.

As a surface conditioning agent for forming the surface conditioning agent layer 61, it may use, for example, a solution obtained by dissolving a halogenated isocyanuric acid such as trichloroisocyanuric acid or a halogen donor such as dibromomethylhydantoin or N-chloro-para-toluene-sulfonamide in a solvent. Of these surface conditioning agents, trichloroisocyanuric acid is preferable because of good availability, good handleability, and a large improvement effect on the adhesiveness. As a solvent for trichloroisocyanuric acid, ethyl acetate, methyl ethyl ketone, methyl acetate, or the like can be used.

(Second Top Coat Agent Layer)

To further increase the adhesive force between the rubber bush 6 and the stabilizer bar 2, it is preferable to form the second top coat agent layer 62 on the surface conditioning agent layer 61 formed on the rubber bush 6, as shown in FIG. 4. The second top coat agent layer 62 only needs to be formed on the surface conditioning agent layer 61, and the dry film thickness of the second top coat agent layer 62 is not particularly limited, and is preferably, for example, 5 µm or more and less than 13 µm.

As a second top coat agent for forming the second top coat agent layer 62, it is preferable to use the same top coat agent as the first top coat agent. In other words, it is preferable to form the second top coat agent layer 62 and the first top coat agent layer 5 from the same adhesive agent. In this case, since the same adhesive agent is used, no difference in adhesive force is created when these top coat agent layers are adhered to each other. Hence, these top coat agent layers can be difficult to peel. Note that the first top coat agent is described in detail later.

(Adhesive Layer(Primer Agent Layer, First Top Coat Agent Layer))

As shown in FIG. 2, the stabilizer bar 2 and the rubber bush 6 are adhesively fixed to each other with the adhesive agent layer 3. The adhesive agent layer 3 includes: the primer agent layer 4 which is formed on the surface of the stabilizer bar 2 and which has a dry film thickness of 3 µm or more and 13 µm or less; and the first top coat agent layer 5 which is formed on the primer agent layer 4 and which has a dry film thickness of 5 µm or more and less than 13 µm. The primer agent layer 4 has a role of increasing the adhesive force to the stabilizer bar 2. The first top coat agent layer 5 has a role of firmly adhesively fixing the rubber bush 6 and the stabilizer bar 2 to each other with the first top coat agent layer 5 interposed therebetween by at least one action of primary bonding (chemical bonding) and secondary bonding (physical bonding) to the rubber bush 6.

When the dry film thickness of the primer agent layer 4 is less than 3 µm, the dry film thickness of the primer agent layer 4 is so small that there arises a possibility that the stabilizer bar 2 and the rubber bush 6 cannot be sufficiently adhesively fixed to each other. Meanwhile, if the dry film thickness of the primer agent layer 4 exceeds 13 µm, the dry film thickness of the primer agent layer 4 is so large, or, in other words, the amount of the primer agent applied is so large that the economical efficiency is poor.

When the dry film thickness of the first top coat agent layer 5 is less than 5 µm, the dry film thickness of the first top coat agent layer 5 is so small that there arises a possibility that the stabilizer bar 2 and the rubber bush 6 cannot be sufficiently adhesively fixed to each other. Meanwhile, if the dry film thickness of the first top coat agent layer 5 is 13 µm or more, the dry film thickness of the first top coat agent layer 5 is so large, or in other words, the amount of the first top coat agent applied is so large that, the economical efficiency is poor.

Here, as described above, the dry film thicknesses of the top coat agent layers of conventional stabilizer bars with rubber bush are 20.3 µm or more and 38.1 µm or less. In contrast, in the stabilizer bar with rubber bush 1 according to this embodiment, the dry film thickness of the first top coat agent layer 5 is smaller than conventional ones, and is specifically 5 µm or more and less than 13 µm. The reason why the good adhesive fixing to the stabilizer bar 2 can be achieved, even when the dry film thickness of the first top coat agent layer 5 in the stabilizer bar with rubber bush 1 according to this embodiment is small as described above is presumably as follows. As described above, by conducting the rubber bush-cleaning step S1 described later under a specific condition, the surface of the rubber bush 6 is cleaned, so that attached substances such as wax and grease is removed almost completely. In other words, by conducting the rubber bush-cleaning step S1 described later under a specific condition, it is possible to almost completely remove the attached substances which are attached to the surface of the rubber bush and which cannot be removed sufficiently by the conventional cleaning using an organic solvent. For this reason, what inhibits the adhesion between the rubber bush 6 and the stabilizer bar 2 are almost completely eliminated, so that the rubber bush 6 and the stabilizer bar 2 is firmly adhered to each other. Presumably as a result of this, the sufficient adhesive effect is obtained even when the first top coat agent layer 5 is formed with a smaller dry film thickness than conventional ones.

Each of the primer agent and the first top coat agent may be, for example, a vulcanization-type adhesive agent for rubber, an adhesive agent capable of forming a chlorine derivative of rubber, or the like. More specifically, the primer agent is preferably one containing, for example, a rubber resin at a ratio of 5% by mass or higher and lower than 10% by mass. Meanwhile, the first top coat agent is preferably one containing, for example, a rubber resin at a ratio of 10% by mass or higher and 15% by mass or lower. By setting each of the content of the rubber resin in the primer agent and the content of the rubber resin in the first top coat agent within the above-described range, it is possible to increase, for example, the affinity for a counterpart member, the static strength, the durability strength with the lapse of time, the fatigue strength, and the like, so that the stabilizer bar 2 and the rubber bush 6 is adhesively fixed to each other more firmly.

Besides the above-described rubber resins, each of the primer agent and the first top coat agent may contain, for example, a substance capable of adhering to a metal or a coating provided on a surface of a metal, or an aromatic nitro compound. Examples of the substance capable of adhering to a metal or a coating provided on a surface of a metal include chlorinated rubber, hydrochlorinated rubber, phenolic resins, vinylic resins, and the like. Meanwhile, examples of the aromatic nitro compound include nitrobenzene, m-dinitrobenzene, p-dinitrobenzene, naphthalene, and the like. Upon application of heat during the vulcanization, the aromatic nitro compound reacts with the rubber to be adhered and remarkably enhances the adhesion between the rubber and the metal (the stabilizer bar 2). As each of the primer agent and the first top coat agent, a commercially available one can also be used. An example of the commercially available agent usable as the primer agent is Chemlok 205 (produced by LORD Far East, Inc.), which is a chlorinated rubber adhesive agent. Meanwhile, an example of the commercially available agent usable as the first top coat agent is, for example, Chemlok 220 (produced by LORD Far East, Inc.), which is a chlorinated rubber adhesive agent. The use of these agents makes it possible to obtain the same effects as those achieved by the above-described primer agent and first top coat agent.

(Control of Dry Film Thicknesses)

To control the dry film thickness of each of the primer agent layer 4, the first top coat agent layer 5, the surface conditioning agent layer 61, and the second top coat agent layer 62, it is preferable to check the relationship between the application condition and the dry film thickness formed under the application condition by performing an experiment or the like in advance, because the dry film thickness varies depending on the application means for forming the layer and the adhesive agent (the primer agent, the first top coat agent, the surface conditioning agent, or the second top coat agent) used. If necessary, the adhesive agent used can be diluted with an organic solvent such as xylene or the like. This makes it easier to adjust the applied amount of the adhesive agent used and control the dry film thickness. For this reason, this makes it possible to obtain the stabilizer bar with rubber bush 1 according to this embodiment which is excellent in environmental friendliness, productivity, and economical efficiency more easily and more surely.

The adhesive agent used can be applied by, for example, application means such as immersion, spraying, brushing, roll coating, electrostatic coating, or the like, and is preferably applied by spraying, because the adhesive agent can be applied with a constant film thickness at a predetermined position of a counterpart member, without uneven application. The adhesive agent used can be dried by, for example, being allowed to stand at 50° C. or above and 90° C. or below for 6 minutes to 10 minutes.

(Method for Producing Stabilizer Bar with Rubber Bush)

Next, a method for producing the stabilizer bar with rubber bush 1 according to this embodiment is described with reference to FIG. 5.

Figure 5:
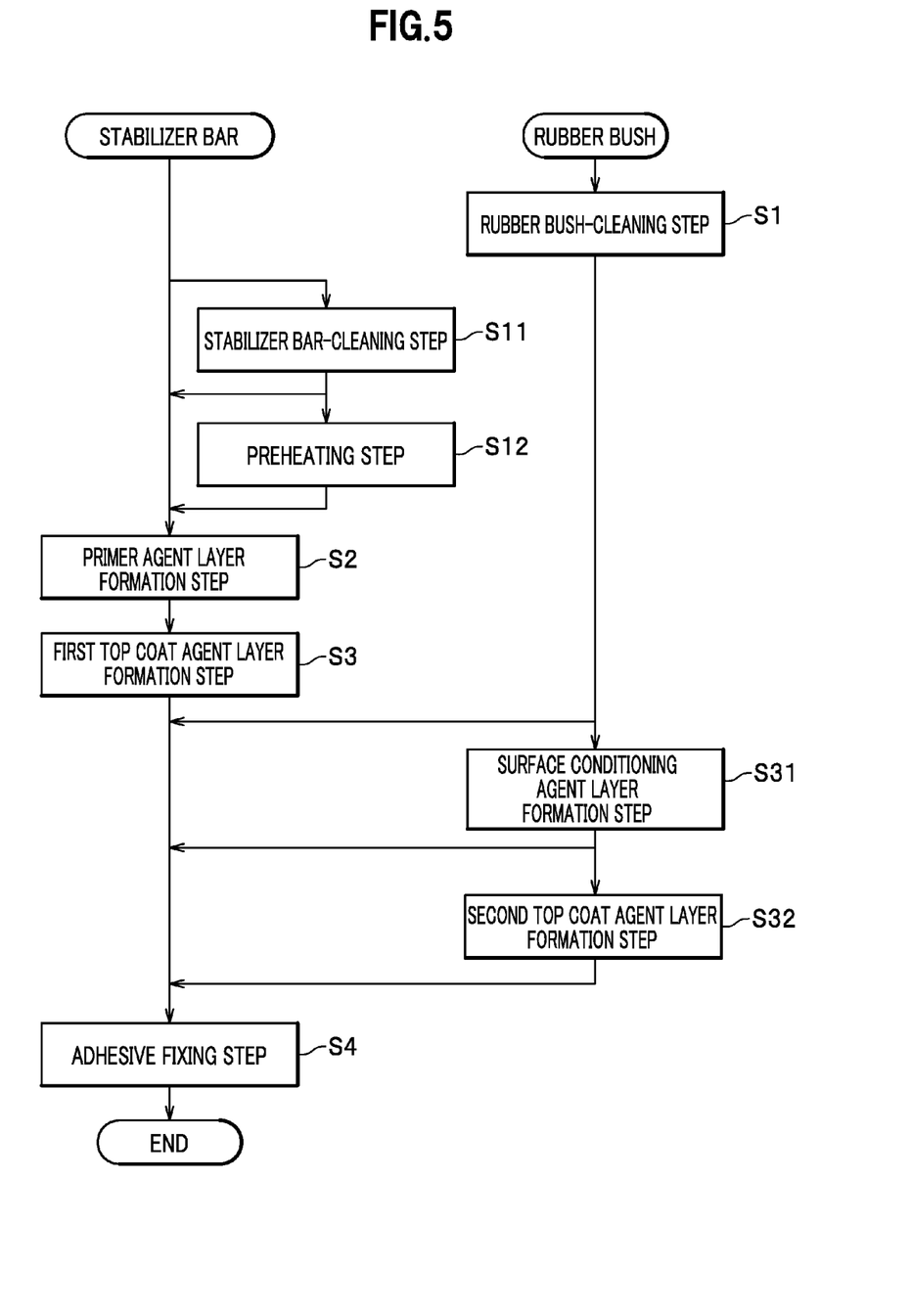
FIG. 5 is a flowchart illustrating a method for producing a stabilizer bar with rubber bush according to the present invention.

As shown in FIG. 5, the method for producing the stabilizer bar with rubber bush 1 according to this embodiment comprises a rubber bush-cleaning step S1, a primer agent layer formation step S2, a first top coat agent layer formation step S3, and an adhesive fixing step S4. In an example shown in FIG. 5, these steps are performed in this order.

Note that the order in which the rubber bush-cleaning step S1, the primer agent layer formation step S2, and the first top coat agent layer formation step S3 are performed is not limited to that described above, but can be modified to any order considering the time schedule. For example, these steps can be performed in the order of the primer agent layer formation step S2, the first top coat agent layer formation step S3, and the rubber bush-cleaning step. Alternatively, these steps can also be performed, for example, in the order of the primer agent layer formation step, the rubber bush-cleaning step, and the first top coat agent layer formation step. The stabilizer bar with rubber bush according to the present invention 1 can be produced in any one of these orders.

Moreover, the method for producing the stabilizer bar with rubber bush 1 according to this embodiment may comprise a stabilizer bar-cleaning step S11 and a preheating step S12, before the primer agent layer formation step S2. In addition, this method may comprise, a surface conditioning agent layer formation step S31 and a second top coat agent layer formation step S32 between the rubber bush-cleaning step S1 and the adhesive fixing step S4. The stabilizer bar-cleaning step S11, the preheating step S12, the surface conditioning agent layer formation step S31, and the second top coat agent layer formation step S32 are optional ones, and may be performed but do not necessarily have to be performed.

In the following description, first, the rubber bush-cleaning step S1, the primer agent layer formation step S2, the first top coat agent layer formation step S3, and the adhesive fixing step S4 are described, and then the stabilizer bar-cleaning step S11, the preheating step S12, the surface conditioning agent layer formation step S31, and the second top coat agent layer formation step S32 are described.

(Rubber Bush-Cleaning Step)

The rubber bush-cleaning step S1 is a step of ultrasonically cleaning the rubber bush 6 in hot water. Note that the temperature of the hot water for performing the rubber bush-cleaning step S1 is, for example, preferably 40° C. or above and 60° C. or below, and more preferably approximately 50° C. Meanwhile, the frequency of the ultrasonic for the ultrasonic cleaning is, for example, preferably 25 kHz or higher and 45 kHz or lower, and more preferably approximately 38 kHz. When the temperature of the hot water is within this range and the frequency of the ultrasonic is within this range, it is possible to remove attached substances such as wax and grease attached to the surface of the rubber bush 6 and place the surface in an extremely clean state, even without using any organic solvent. Accordingly, even when the first top coat agent layer 5 is formed to have a smaller dry film thickness than conventional ones as described above, the rubber bush 6 is firmly adhesively fixed to the stabilizer bar 2.

In addition, no organic solvent such as xylene is used for cleaning the rubber bush 6, no VOCs are generated during the producing, and the working environment is not impaired. In addition, since no degreasing with a solvent is performed, it is not necessary to rinse an organic solvent attached to the surface with water or the like, so that the step number and the cost of materials can be reduced. In other words, the method for producing the stabilizer bar with rubber bush 1 according to this embodiment in which the rubber bush-cleaning step S1 is performed is excellent in environmental friendliness and productivity.

(Primer Agent Layer Formation Step)

The primer agent layer formation step S2 is a step of forming the primer agent layer 4 by applying a primer agent to the stabilizer bar 2 at a predetermined portion where the rubber bush 6 is to be adhered to achieve a dry film thickness of 3 μm or more and 13 μm or less, followed by drying. Note that the reason why the dry film thickness of the primer agent layer 4 is set within this range and the point that the primer agent preferably contains a rubber resin at a ratio of 5% by mass or higher and lower than 10% by mass are the same as described above.

As described above, the primer agent can be applied onto the stabilizer bar 2, for example, by application means such as immersion, spraying, brushing, roll coating, electrostatic coating, or the like, and is preferably applied by spraying, because the primer agent can be applied with a constant film thickness at a predetermined position in the stabilizer bar 2, without uneven application.

As described above, the primer agent is dried by, for example, being allowed to stand at 50° C. or above and 90° C. or below for 6 minutes to 10 minutes.

(First Top Coat Agent Layer Formation Step)

The first top coat agent layer formation step S3 is a step of forming the first top coat agent layer 5 by applying the first top coat agent onto the formed primer agent layer 4 to have a dry film thickness of 5 μm or more and less than 13 μm, followed by drying. Note that the reason why the dry film thickness of the first top coat agent layer 5 is set within this range and the point that the first top coat agent preferably contains a rubber resin at a ratio of 10% by mass or higher and 15% by mass or lower are the same as described above.

As in the case of the application of the primer agent, the first top coat agent can be applied onto the primer agent layer 4 by, for example, application means such as immersion, spraying, brushing, roll coating, or electrostatic coating, and the first top coat agent is preferably applied by spraying, because the first top coat agent is applied onto the primer agent layer 4 with a constant film thickness, without uneven application.

The first top coat agent is dried by, for example, being allowed to stand at 50° C. or above and 90° C. or below for 6 minutes to 10 minute.

(Adhesive Fixing Step)

The adhesive fixing step S4 is a step of bringing the rubber bush 6 subjected to the ultrasonic cleaning in the rubber bush-cleaning step S1 into contact with the first top coat agent layer 5 and adhesively fixing the rubber bush 6 onto the first top coat agent layer 5. By performing the adhesive fixing step S4, the stabilizer bar with rubber bush 1 according to this embodiment is completed in which the rubber bush 6 is adhesively fixed to the stabilizer bar 2 at the predetermined position thereof.

In the adhesive fixing step S4, it is preferable to cause a vulcanization reaction to increase the strength by increasing the cross-linking density of the rubber bush 6 under heating at a predetermined temperature. The vulcanization reaction and the adhesive fixing step S4 are preferably performed in a commercially available vulcanization apparatus.

Note that when the rubber bush 6 has a bottomless cylindrical shape, the rubber bush 6 may be brought from the end portion of the stabilizer bar 2 to be inserted through the rubber bush 6, and moved to the predetermined position where the first top coat agent layer 5 has been formed. In addition, when the rubber bush 6 is divided into several parts, the parts may be adhered to each other by vulcanization into one piece, while being adhesively fixed to the stabilizer bar 2 at the predetermined position with the adhesive agent layer 3.

(Stabilizer Bar-Cleaning Step)

The stabilizer bar-cleaning step S11 is a step of cleaning the surface of the stabilizer bar 2. By performing this step, it is possible to remove attached substances such as protection oil, cutting oil, grease, and dust attached to the surface of the stabilizer bar 2. For this reason, the stabilizer bar 2 and the rubber bush 6 are adhesively fixed to each other more firmly. The surface of the stabilizer bar 2 is cleaned by using, for example, an organic solvent such as xylene. After the cleaning, the stabilizer bar 2 is preferably rinsed with water or the like.

After completion of the stabilizer bar-cleaning step S11, the primer agent layer formation step S2 may be performed, or the preheating step S12 described later may be performed. Which of these steps is to be performed can be determined at one's discretion.

(Preheating Step)

The preheating step S12 is a step performed after the stabilizer bar-cleaning step S11, and is a step of preheating the stabilizer bar 2 cleaned in the stabilizer bar-cleaning step S11. By performing this step, the following effects can be obtained: (1) the organic solvent for the cleaning is completely vaporized, (2) since the solvent is vaporized, the viscosity of the paint (adhesive agent) is improved, which makes all the paints including the primer agent less likely to undergo sagging in the later steps, and (3) dew water is removed. The preheating step S12 can be performed by using, for example, a commercially available heating apparatus. The preheating temperature may be, for example, 50° C. or above and 80° C. or below. The preheating time is not particularly limited, as long as the temperature of the stabilizer bar 2 is set in the above-described range.

After completion of the preheating step S12, the primer agent layer formation step S2 is performed.

(Surface Conditioning Agent Layer Formation Step)

The surface conditioning agent layer formation step S31 is a step of forming the surface conditioning agent layer 61 by applying a surface conditioning agent onto at least a portion of the surface of the rubber bush 6, followed by drying. By performing the surface conditioning agent layer formation step S31, the adhesive force between the rubber bush 6 and the stabilizer bar 2 is further increased. Note that since the surface conditioning agent is already described in detail, the description thereof is omitted here. The surface conditioning agent can be applied by, for example, application means such as immersion, spraying, brushing, roll coating, or electrostatic coating, and the surface conditioning agent is preferably applied by spraying, because the surface conditioning agent is applied onto the rubber bush 6 at a predetermined position thereof with a constant film thickness, without uneven application. The surface conditioning agent is dried by, for example, being allowed to stand at 50° C. or above and 90° C. or below for 6 minutes to 10 minutes.

After completion of the surface conditioning agent layer formation step S31, the adhesive fixing step S4 may be performed or the second top coat agent layer formation step S32 described later may be performed. Which of these steps is to be performed can be determined at one's discretion.

(Second Top Coat Agent Layer Formation Step)

The second top coat agent layer formation step S32 is a step performed after the surface conditioning agent layer formation step S31 and is a step of forming the second top coat agent layer 62 by applying a second top coat agent onto the surface conditioning agent layer 61, followed by drying. By performing the second top coat agent layer formation step S32, the adhesive force between the rubber bush 6 and the stabilizer bar 2 is further increased. Note that since the second top coat agent is already described in detail, the description thereof is omitted here. The second top coat agent is applied by, for example, application means such as immersion, spraying, brushing, roll coating, or electrostatic coating, and the second top coat agent is preferably applied by spraying, because the second top coat agent is applied onto the surface conditioning agent layer 61 with a constant film thickness, without uneven application. The second top coat agent is dried by, for example, being allowed to stand at 50° C. or above and 90° C. or below for 6 minutes to 10 minutes.

After completion of the second top coat agent layer formation step S32, the adhesive fixing step S4 is performed.

(Effects)

In the stabilizer bar with rubber bush 1 and the method for producing the same according to this embodiment described above, the stabilizer bar 2 and the rubber bush 6 are adhesively fixed to each other with the primer agent layer 4 which is formed on the surface of the stabilizer bar 2 and which has a dry film thickness of 3 μm or more and 13 μm or less and the first top coat agent layer 5 which is formed on the primer agent layer 4 and which has a dry film thickness of 5 μm or more and less than 13 μm. In the stabilizer bar with rubber bush 1 and the method for producing the same according to this embodiment, the dry film thickness of the first top coat agent layer 5 is smaller than conventional ones as described above. Hence, the amounts of the adhesive agents (especially, the first top coat agent) used and applied are reduced, and the production cost is reduced. In other words, the stabilizer bar with rubber bush 1 and the method for producing the same according to this embodiment are excellent in economical efficiency. Especially, criteria for evaluating the working environment regarding organic solvents have been determined recently under the Industrial Safety and Health Act. These criteria are easily achieved in the producing process, even when the producing amount increases. Moreover, with the standard of action for environment having widely prevailed recently, criteria for evaluating the working environment including those of VOCs can be met at advanced levels.

Moreover, as described in the method for producing the stabilizer bar with rubber bush 1 according to this embodiment, the rubber bush 6 is ultrasonically cleaned in hot water in the rubber bush-cleaning step S1. Hence, no solvent degreasing is performed. Therefore, VOCs are not generated over many process areas during the producing, and the working environment is not impaired. Moreover, since no solvent degreasing is performed, it is not necessary to rinse an organic solvent attached to the surface of the rubber bush 6 with water or the like, so that the number of steps and the cost of materials are reduced. In sum, the stabilizer bar with rubber bush 1 and the method for producing the same according to this embodiment are excellent in environmental friendliness and productivity.

The rubber bush 6 was peeled off from the stabilizer bar 2 of the stabilizer bar with rubber bush 1 according to this embodiment, and the state of the adhesion between the rubber bush 6 and the stabilizer bar 2 was observed. The result showed that the stabilizer bar with rubber bush 1 according to this embodiment underwent the rubber break, as in the case of conventional stabilizer bars with rubber bush. Therefore, it was demonstrated that even when the amount of the adhesive agent used was smaller than conventional ones, the obtained product was usable as a stabilizer bar with rubber bush.

REFERENCE SIGNS LIST 1 stabilizer bar with rubber bush
1a center portion
2 stabilizer bar
3 adhesive agent layer
4 primer agent layer
5 first top coat agent layer
6 rubber bush
61 surface conditioning agent layer
62 second top coat agent layer
7 bracket
8 vehicle body
10 suspension device
11 shock absorber
12 link arm member
W wheel

What is claimed is:

1. A method for producing a stabilizer bar with rubber bush, comprising:
   a rubber bush-cleaning step of ultrasonically cleaning a rubber bush in hot water;
   a primer agent layer formation step of forming a primer agent layer by applying a primer agent to a stabilizer bar at a predetermined portion where the rubber bush is to be adhered to achieve a dry film thickness of 3 μm or more and 13 μm or less, followed by drying;
   a first top coat agent layer formation step of forming a first top coat agent layer by applying a first top coat agent onto the formed primer agent layer to achieve a dry film thickness of 5 μm or more and less than 13 μm, followed by drying; and
   an adhesive fixing step of bringing the rubber bush subjected to the ultrasonic cleaning into contact with the first top coat agent layer and adhesively fixing the rubber bush onto the first top coat agent layer,
   wherein the primer agent contains a rubber resin at a ratio of 5% by mass or higher and lower than 10% by mass, and
   wherein the first top coat agent contains a rubber resin at a ratio of 10% by mass or higher and 15% by mass or lower.

2. The method for producing the stabilizer bar with rubber bush set forth in claim 1,
   wherein the rubber bush-cleaning step, the primer agent layer formation step, and the first top coat agent layer formation step are performed in an order of the primer agent layer formation step, the first top coat agent layer formation step, and the rubber bush-cleaning step or in an order of the primer agent layer formation step, the rubber bush-cleaning step, and the first top coat agent layer formation step.

3. The method for producing the stabilizer bar with rubber bush set forth in claim 1, further comprising:
   a stabilizer bar-cleaning step, before the primer agent layer formation step, of cleaning a surface of the stabilizer bar.

4. The method for producing the stabilizer bar with rubber bush set forth in claim 3, further comprising:

a preheating step, after the stabilizer bar cleaning step, of preheating the cleaned stabilizer bar.

5. The method for producing the stabilizer bar with rubber bush set forth in claim 1,
wherein the hot water has a temperature of 40° C. or above and 60° C. or below, and
wherein the ultrasonic for the ultrasonic cleaning has a frequency of 25 kHz or higher and 45 kHz or lower.

6. The method for producing the stabilizer bar with rubber bush set forth in claim 1,
wherein the hot water has a temperature of approximately 50° C., and
wherein the ultrasonic for the ultrasonic cleaning has a frequency of approximately 38 kHz.

* * * * *